United States Patent
Howe et al.

(10) Patent No.: US 9,638,103 B2
(45) Date of Patent: May 2, 2017

(54) PLASMA FLOW CONTROL INLET PARTICLE SEPARATOR SYSTEM

(71) Applicant: HONEYWELL INTERNATIONAL INC., Morristown, NJ (US)

(72) Inventors: Jeff Howe, Chandler, AZ (US); Nick Nolcheff, Chandler, AZ (US); Harry Lester Kington, Scottsdale, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 950 days.

(21) Appl. No.: 13/951,592

(22) Filed: Jul. 26, 2013

(65) Prior Publication Data

US 2015/0030435 A1    Jan. 29, 2015

(51) Int. Cl.
*F02C 7/052* (2006.01)

(52) U.S. Cl.
CPC .......... *F02C 7/052* (2013.01); *F05D 2250/71* (2013.01); *F05D 2260/16* (2013.01); *F05D 2270/172* (2013.01)

(58) Field of Classification Search
CPC .. F02C 7/052; F05D 2260/16; F05D 2250/71; F05D 2270/172
USPC ........................................................ 415/121.2
See application file for complete search history.

(56) References Cited

U.S. PATENT DOCUMENTS

| | | | |
|---|---|---|---|
| 4,509,962 A | 4/1985 | Breitman et al. | |
| 4,527,387 A * | 7/1985 | Lastrina | F02C 7/052 244/53 B |
| 4,928,480 A | 5/1990 | Oliver et al. | |
| 7,296,395 B1 * | 11/2007 | Hartman | B01D 45/04 244/53 B |
| 7,596,938 B2 | 10/2009 | Bart et al. | |
| 7,678,165 B2 | 3/2010 | Tingle et al. | |
| 7,802,433 B2 * | 9/2010 | Higgins | F02C 7/042 60/39.091 |
| 7,927,408 B2 | 4/2011 | Sheoran et al. | |
| 2008/0156187 A1 * | 7/2008 | Tingle | F02C 7/052 95/22 |
| 2009/0065064 A1 * | 3/2009 | Morris | F01D 11/20 137/2 |
| 2009/0293485 A1 * | 12/2009 | Nolcheff | F01D 9/02 60/751 |
| 2010/0172747 A1 * | 7/2010 | Clark | F01D 5/143 415/177 |

OTHER PUBLICATIONS

Ying-Hong Li, et al.; Plasma Flow Control, Air Force Engineering University of China, People's Republic of China; www.intechopen.com.

* cited by examiner

*Primary Examiner* — Ninh H Nguyen
*Assistant Examiner* — Aaron R Eastman
(74) *Attorney, Agent, or Firm* — Lorenz & Kopf, LLP

(57) ABSTRACT

An inlet particle separator system for an engine includes a hub section, a shroud section, a splitter, and a plasma flow control actuator. The shroud section surrounds at least a portion of the hub section and is spaced apart therefrom to define a passageway having an air inlet. The splitter is disposed downstream of the air inlet and extends into the passageway to divide the passageway into a scavenge flow path and an engine flow path. The plasma flow control actuator is coupled to the hub section and is disposed between the air inlet and the splitter.

16 Claims, 5 Drawing Sheets

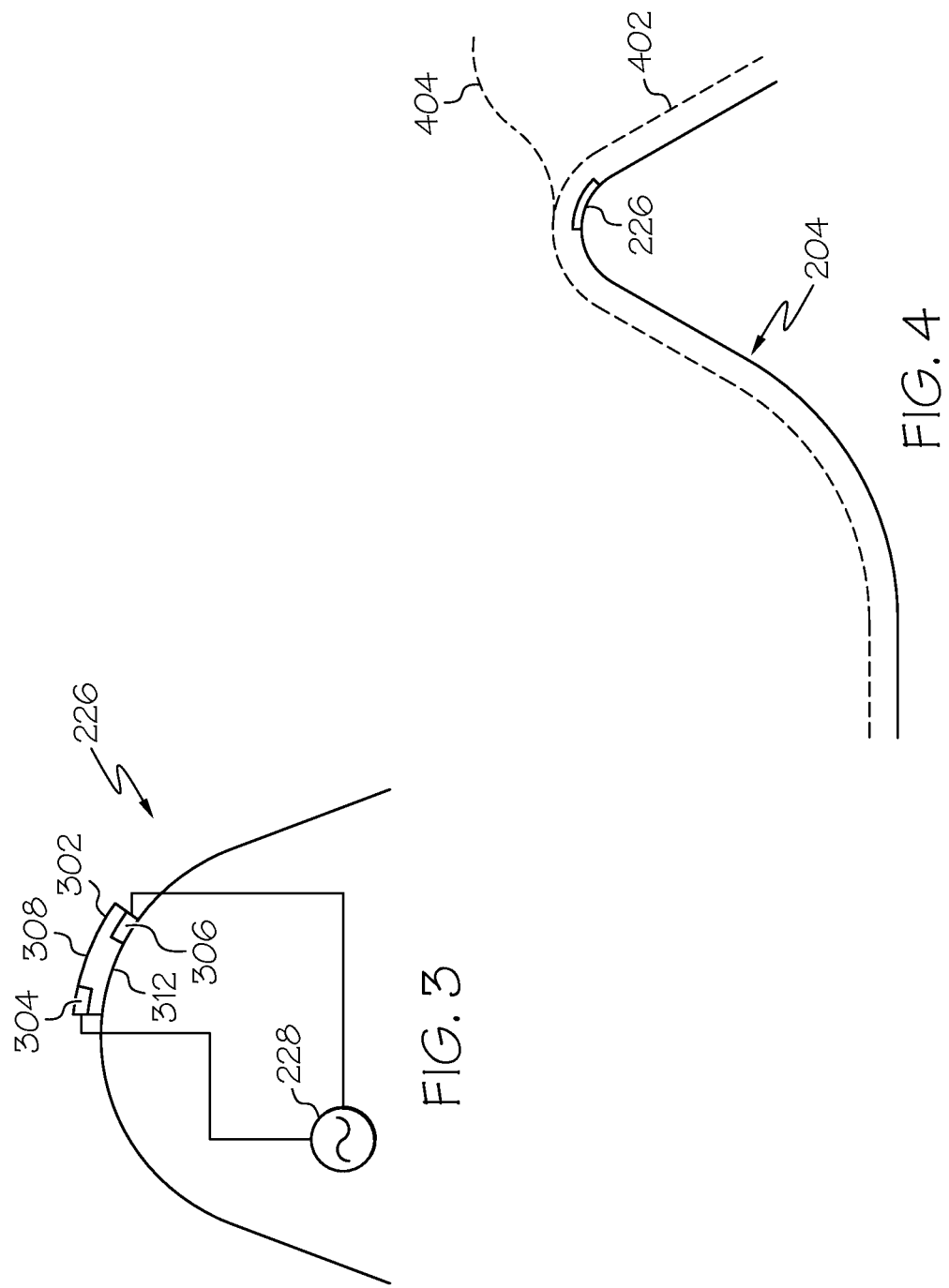

PLASMA FLOW CONTROL INLET PARTICLE SEPARATOR SYSTEM

TECHNICAL FIELD

The present invention generally relates to an inlet particle separator system for a vehicle engine, and more particularly relates to an inlet particle separator system that includes a plasma flow control actuator to improve fine particulate separation efficiency.

BACKGROUND

During operation of an aeronautical vehicle, air is induced into an engine and, when mixed with a combustible fuel, is used to generate energy to propel the vehicle. The induced air may contain undesirable particles, such as sand and dust, which can degrade engine components. In order to prevent or at least minimize such degradation, many aeronautical vehicles use an inlet particle separator system, disposed upstream of the engine, to remove at least a portion of the undesirable particles.

A conventional inlet particle separator typically includes an inlet duct system having a fluid passageway that transitions into a scavenge flow path and an engine flow path. Air that is induced into the fluid passageway may have particles suspended therein. The inertia of relatively larger ones of the suspended particles tends to cause these particles to travel in a straight line rather than follow the fluid passageway. Because of the manner in which the inlet particle separator is configured, most of the suspended particles tend to flow into the scavenge flow path rather than curve into the engine flow path. As such, relatively clean air is directed into the engine, and contaminated air, which has the particles suspended therein, is directed through the scavenge flow path and is discharged.

Conventional inlet particle separators, such as those described above, operate at relatively high separation efficiencies (separation efficiency is defined as percentage of the inlet dust collected) for relatively large particles (e.g., >80 microns). However, for relatively small particles (e.g., <80 microns), the efficiencies can be relatively low, resulting in a significant amount of these relatively small particles being ingested into the engine compressor. These relatively small particles, while being potentially less troublesome than the relatively large particles, can still have some deleterious effects. For example, these particles can plug secondary flow lines and/or can melt and form glass on relatively hot engine components, such as the combustor, which can significantly reduce engine performance or have other undesirable effects.

One method that has been postulated to increase the separation efficiency of relatively small particles is to increase the steepness of the fluid passageway upstream of the transition to the scavenge flow and engine flow paths. This method is undesirable because it results in boundary layer separation of the air flow downstream of the transition, which increases pressure losses.

Hence, there is a need for an inlet particle separator system that increases the separation efficiency of relatively small particles from engine inlet air without increasing pressure loss in the particulate separation region. The present invention addresses at least this need.

BRIEF SUMMARY

In one embodiment, an inlet particle separator system for an engine includes a hub section, a shroud section, a splitter, and a plasma flow control actuator. The shroud section surrounds at least a portion of the hub section and is spaced apart therefrom to define a passageway having an air inlet. The splitter is disposed downstream of the air inlet and extends into the passageway to divide the passageway into a scavenge flow path and an engine flow path. The plasma flow control actuator is coupled to the hub section and is disposed between the air inlet and the splitter.

In another embodiment, a gas turbine engine includes a compressor section, a combustion section, and a turbine section disposed in flow series, and an inlet particle separator system. The compressor section has an air inlet. The inlet particle separator system is coupled to, and is disposed upstream of, the compressor section, and includes a hub section, a shroud section, a splitter, and a plasma flow control actuator. The shroud section surrounds at least a portion of the hub section and is spaced apart therefrom to define a passageway having an air inlet. The splitter is disposed downstream of the air inlet and extends into the passageway to divide the passageway into a scavenge flow path and an engine flow path. The plasma flow control actuator is coupled to the hub section and is disposed between the air inlet and the splitter.

In yet another embodiment, an inlet particle separator system for an engine having an engine centerline includes a hub section, a shroud section, a splitter, and a plasma flow control actuator. The shroud section surrounds at least a portion of the hub section and is spaced apart therefrom to define a passageway having an air inlet and a cross sectional flow area. The splitter is disposed downstream of the air inlet and extends into the passageway to divide the passageway into a scavenge flow path and an engine flow path. The plasma flow control actuator is coupled to the hub section and is disposed between the air inlet and the splitter. The hub section is configured to be symmetrically disposed about the engine centerline, and includes an inlet portion, an outlet portion, and a transition portion disposed between the inlet and outlet portions. The inlet portion is defined by a first surface having a first maximum angle at a first point. The first maximum angle is relative to the engine centerline. The outlet portion is defined by a second surface having a second maximum angle at a second point. The second maximum angle is also relative to the engine centerline. The transition portion is defined by a third surface having a curvature that defines a hub turning angle. The hub turning angle is defined as a symmetric arc that subtends a first line and a second line. The first line is a line that extends through the first point at the first maximum angle, and the second line is a line that extends through the second point at the second maximum angle. The first maximum angle is greater than 30-degrees, and the symmetric arc is greater than 280-degrees. The plasma flow control actuator is disposed on the transition portion.

Furthermore, other desirable features and characteristics of the inlet particle separator system will become apparent from the subsequent detailed description of the invention and the appended claims, taken in conjunction with the accompanying drawings and this background of the invention.

BRIEF DESCRIPTION OF THE DRAWINGS

The present invention will hereinafter be described in conjunction with the following drawing figures, wherein like numerals denote like elements, and wherein:

FIG. 3 depicts a simplified schematic representation of one embodiment of a plasma flow control actuator that may be implemented in the inlet particle separation system of FIG. 2;

FIG. 4 is a simplified cross section view of a portion of the inlet particle separator system of FIG. 2, illustrating separation efficiency effects relative to a conventional inlet particle separator system;

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Figure 1:
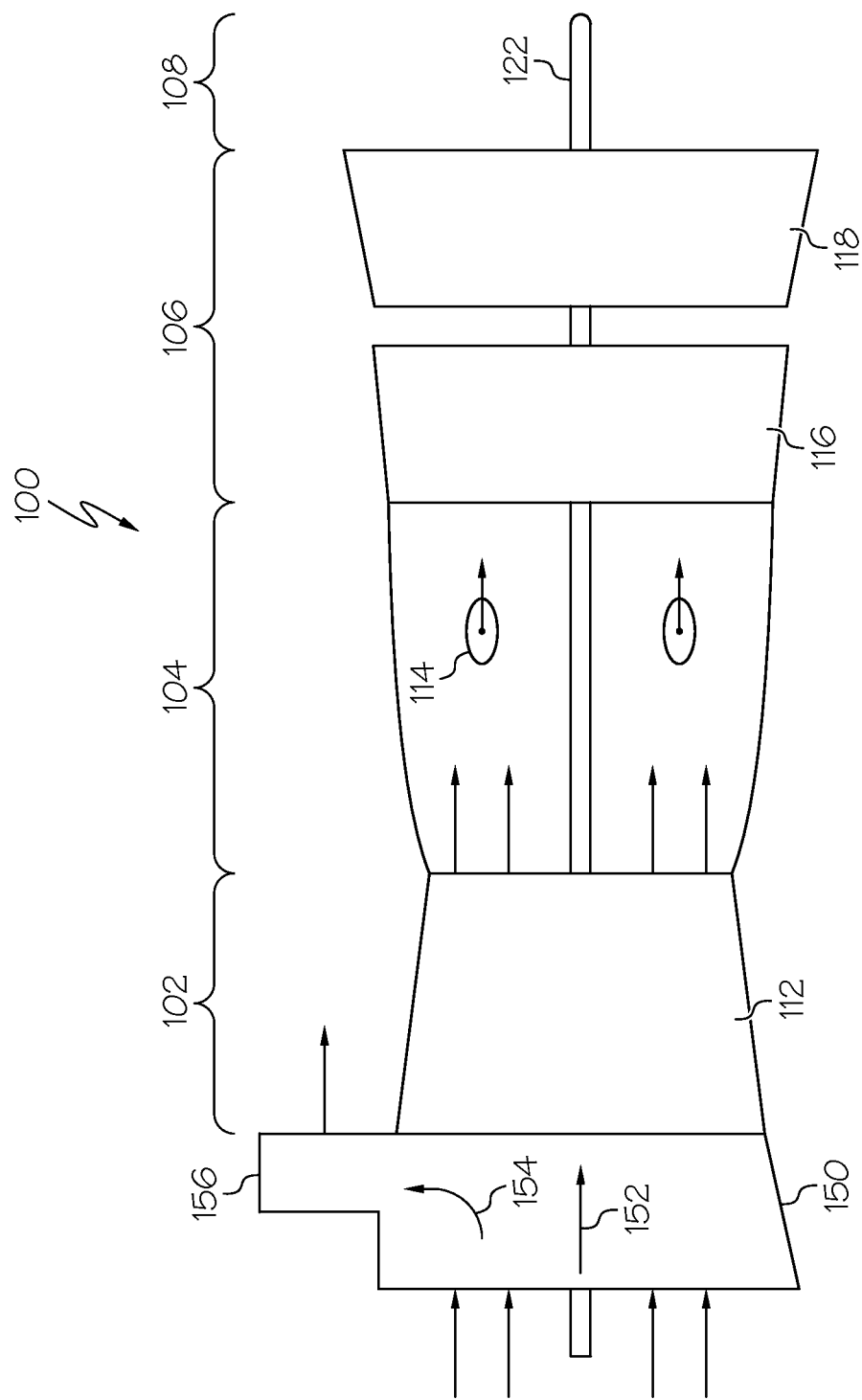
FIG. 1 is a functional block diagram of an exemplary gas turbine engine.

Turning now to FIG. 1, a functional block diagram of an exemplary gas turbine engine 100 is depicted. The depicted engine 100 is a single-spool turbo-shaft gas turbine propulsion engine, and includes a compressor section 102, a combustion section 104, a turbine section 106, and an exhaust section 108. The compressor section 102, which may include one or more compressors 112, draws air into the engine 100 and compresses the air to raise its pressure. In the depicted embodiment, only a single compressor 112 is shown, though it will be appreciated that one or more additional compressors could be used.

No matter the particular number of compressors 112 that are included in the compressor section 102, the compressed air is directed into the combustion section 104. In the combustion section 104, which includes a combustor assembly 114, the compressed air is mixed with fuel supplied from a non-illustrated fuel source. The fuel and air mixture is combusted, and the high energy combusted air mixture is then directed into the turbine section 106.

The turbine section 106 includes one or more turbines. In the depicted embodiment, the turbine section 106 includes two turbines, a high pressure turbine 116 and a low power turbine 118. However, it will be appreciated that the engine 100 could be configured with more or less than this number of turbines. No matter the particular number, the combusted air mixture from the combustion section 104 expands through each turbine 116, 118, causing it to rotate a power shaft 122. The combusted air mixture is then exhausted via the exhaust section 108. The power shaft 122 may be used to drive various devices within the engine or vehicle. For example, in the context of a helicopter, the power shaft may be used to drive one or more rotors.

As FIG. 1 further depicts, the gas turbine engine 100 also includes an inlet particle separator system 150. The inlet particle separator system 150 is coupled to, and disposed upstream of, the compressor section 102. The air that the compressor section 102 draws into the engine 100 first enters the inlet particle separator system 150. The inlet particle separator system 150, as will be described in more detail further below, is configured to separate the air that is drawn into the engine 100 into compressor inlet air 152 and scavenge air 154. The compressor inlet air 152 is drawn into the compressor section 102, and the scavenge air 154 is drawn into, for example, a scavenge scroll 156 and is then discharged into the atmosphere. The particle separator system 150 is additionally configured such that at least a portion of any particulate that is suspended in the air that is drawn into the engine 100 is separated therefrom and is discharged with the scavenge air 154. Thus, the compressor inlet air 152 that is drawn into the compressor section 102 is relatively clean, particulate free air.

Figure 2:
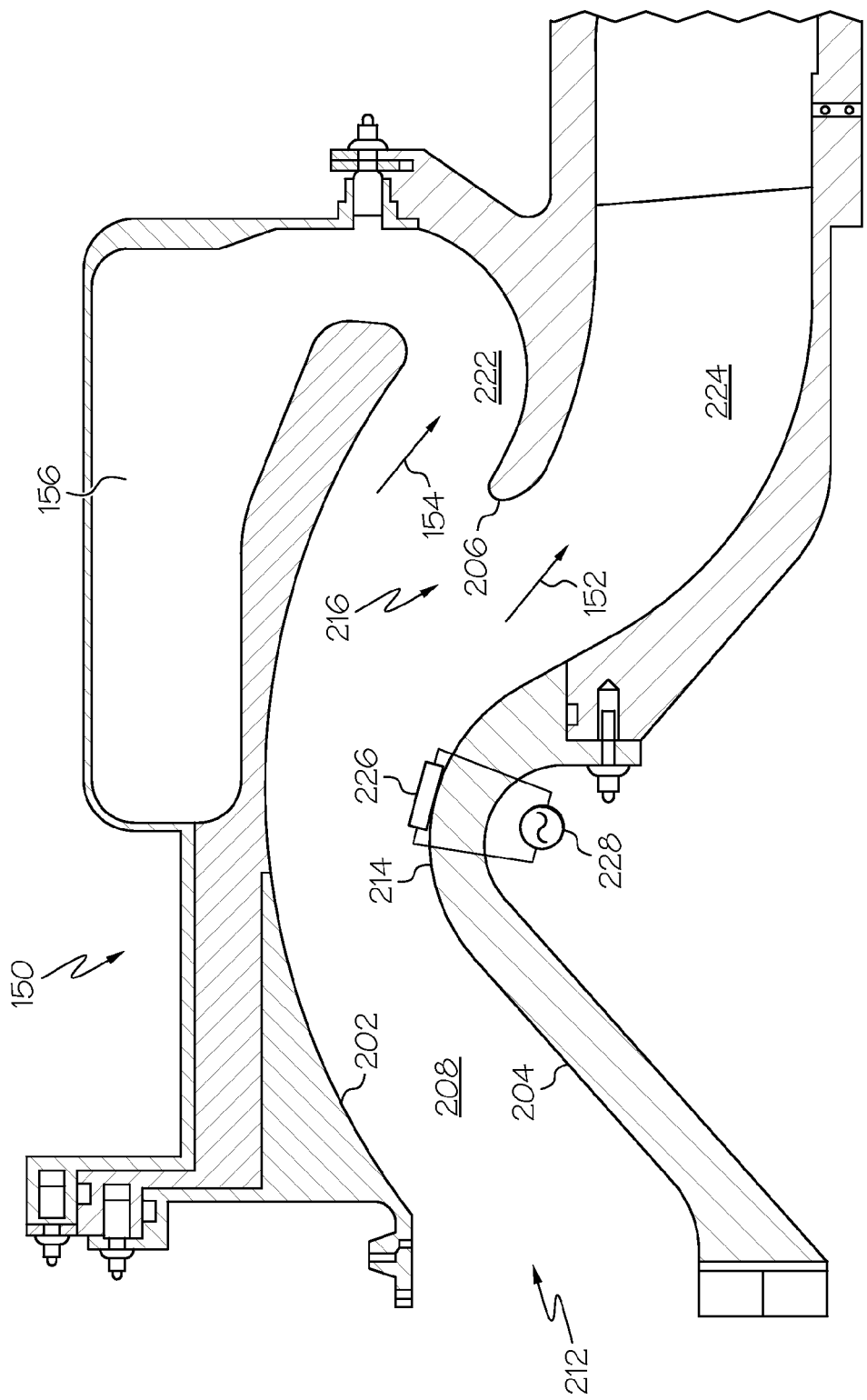
FIG. 2 is a partial cross-sectional view of one embodiment of an inlet particle separator system that may be implemented in the gas turbine engine of FIG. 1.

Referring now to FIG. 2, a cross section view of portions of the inlet particle separator system 150 is depicted and will be described. The inlet particle separator system 150 includes a shroud section 202, a hub section 204, and a splitter 206. The shroud section 202 surrounds at least a portion of the hub section 204 and is spaced apart therefrom to define a passageway 208 having an air inlet 212. The air inlet 212 is configured to receive the air that is drawn into the engine 100. The shroud section 202 and hub section 204 may be variously configured, but in the depicted embodiment the outer diameter of the hub section 204 gradually increases downstream of the air inlet 212 to a point of maximum diameter 214, and then decreases downstream of this point 214. The shroud section 202 and hub section 204 are configured such that the flow passageway downstream of the point of maximum diameter defines what is referred to herein as the separation section 216.

The separation section 216 is where the air that is drawn into the engine 100, and more specifically the air that is drawn into the air inlet 212, is separated into the compressor inlet air 152 and the scavenge air 154. The separation section 216 is also where the splitter 206 is disposed. In particular, the splitter 206 extends into the passageway 208 downstream of the air inlet 212, and more specifically downstream of the point of maximum diameter 214, and divides the passageway 208 into a scavenge flow path 222, into which the scavenge air 154 flows, and an engine flow path 224, into which the compressor inlet air 152 flows.

As is generally known, air that is drawn into the engine 100 may have particles entrained therein. Due to their inertia, relatively larger (e.g., >80 microns) entrained particles will tend to collect adjacent the shroud section 202, and will thus flow with the scavenge air 154 into the scavenge flow path 222. As previously noted, the scavenge air 154 is drawn into the scavenge scroll 156 and is then eventually discharged into the atmosphere. The compressor inlet air 152, which has relatively few large particles entrained therein, flows into the engine flow path 224, and ultimately into the compressor section 102 (not depicted in FIG. 2).

It was noted above that, at least in some instances, relatively small entrained particles (e.g., <80 microns) can flow with the compressor inlet air 152 into the engine flow path 224, and thus be ingested into the compressor section 102. To prevent, or at least inhibit, a large portion of the relatively small particles from flowing into the compressor section 102, the depicted inlet particle separator system 150 includes a plasma flow control actuator 226. The plasma flow control actuator 226 is coupled to the hub section 204 and is disposed between the air inlet 212 and the splitter 206. More specifically, the plasma flow control actuator 226 is disposed at least adjacent to the point of maximum diameter 214, and is preferably disposed at or near the point of maximum diameter 214.

The plasma flow control actuator 226 may be variously configured, but in the depicted embodiment, and with reference now to FIG. 3, it includes a dielectric 302, a first electrode 304, and a second electrode 306. The dielectric 302, which may be formed of any one of numerous types of dielectric materials, includes a first side 308 and a second side 312. The first and second electrodes 304, 306, which may be formed of any one of numerous conductive materials, are coupled to the first side 308 and the second side 312, respectively, of the dielectric material.

As FIGS. 2 and 3 also depict, an electric power source 228 is electrically coupled to the plasma flow control actuator 226, and more specifically to the first and second electrodes 304, 306. The electric power source 228 is preferably an alternating current (AC) power source that is configured to generate and supply AC power to the plasma flow control actuator 226 at a voltage and frequency that is suitable to control air flow adjacent the hub section 204.

Referring now to FIG. 4, when the electric power source 228 energizes the plasma flow control actuator 226 at the appropriate amplitude and frequency, a charge is induced in the boundary layer of the air flow in the region of the first electrode 304. As a result, the boundary layer 402 flows along the surface of the hub section 204 toward the second electrode 306. Without the plasma flow control actuator 226, as shown using reference numeral 404, the boundary layer would separate from the surface of the hub section 204.

Because the plasma flow control actuator 226 can cause the boundary layer 402 to flow along the surface of the hub section 204, the hub section 204 may be configured so that the passageway 208 between the air inlet 212 and the throat section 214 is significantly steeper than in presently known systems. This steeper flow path deflects a larger percentage of suspended particulate into the scavenge air. As a result, not only is the dust collection efficiency of the relatively large particles increased, but so too is the collection efficiency of the relatively small particles.

Figure 5:
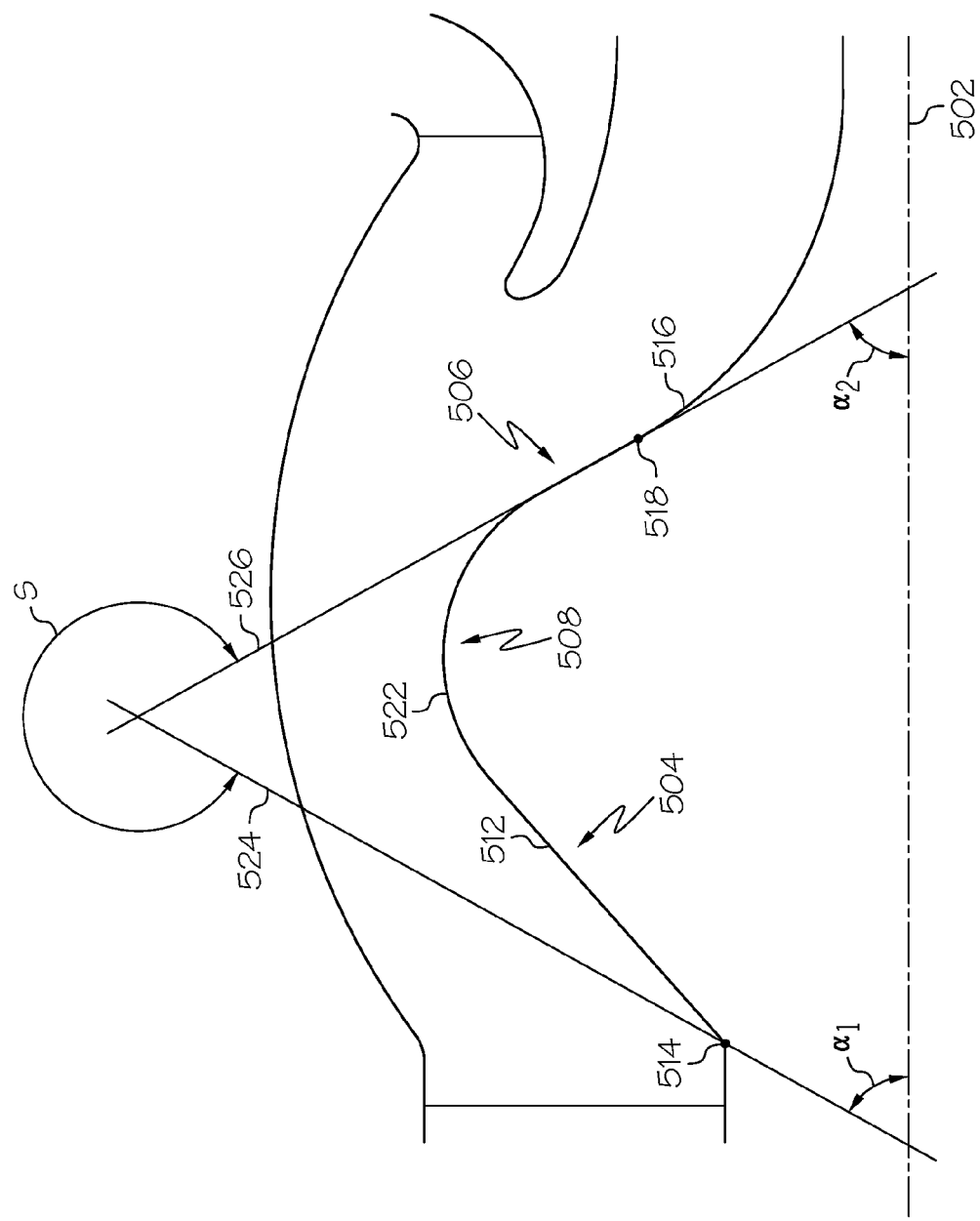
FIG. 5 is a simplified cross section view of a portion of the inlet particle separator system of FIG. 2, illustrating certain structural definitions thereof.

The steepness of the flow path may be variously defined, but herein, and with reference to FIG. 5, one method of defining the steepness will be described. As is generally known, the engine has an engine centerline 502. The hub section 204 is symmetrically disposed about the engine centerline 502, and includes an inlet portion 504, an outlet portion 506, and a transition portion 508 that is disposed between the inlet and outlet portions 504, 506. The inlet portion 504 is defined by a first surface 512 that has a first maximum angle ($\alpha_1$), relative to the engine centerline 502, at a first point 514. Similarly, the outlet portion 506 is defined by a second surface 516 that has a second maximum angle ($\alpha_2$), relative to the engine centerline 502, at a second point 518.

The transition portion 508 is defined by a third surface 522 having a curvature that defines a hub turning angle. The hub turning angle is defined as a symmetric arc (s) that subtends a first line 524 and a second line 526. The first line 524 is a line that extends through the first point 514 at the first maximum angle ($\alpha_1$), and the second line 526 is a line that extends through the second point 518 at the second maximum angle ($\alpha_2$). It will be appreciated that the values of the first maximum angle, the second maximum angle and the hub turning angle may vary. Preferably, however, the first maximum angle ($\alpha_1$) is greater than 30-degrees, and the symmetric arc (s) is greater than 280 degrees.

Figure 6:
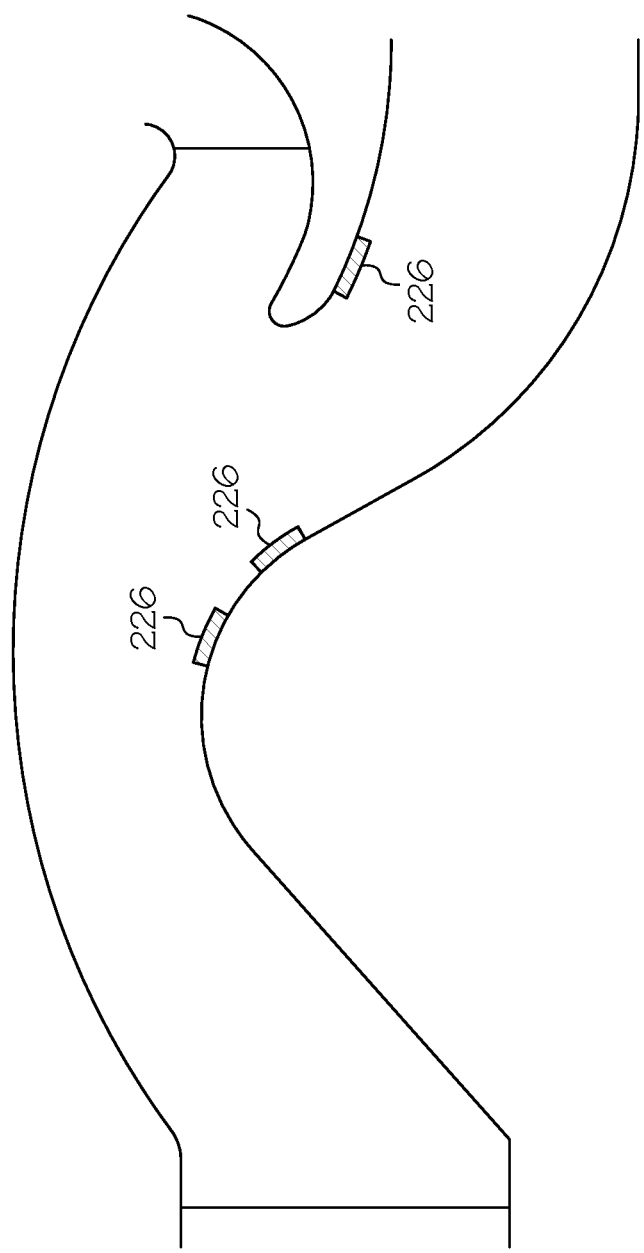
FIG. 6 is a simplified cross section view of a portion of another embodiment of an inlet particle separator system.

It is noted that although the embodiment depicted in FIG. 2 includes only a single plasma flow control actuator, the inlet particle separator system 150 may, in some embodiments, be implemented with one or more additional plasma flow actuators. For example, as depicted in FIG. 6, one or more additional plasma flow actuators 226 may be disposed on the hub section 204 and/or on the splitter 206.

The inlet particle separator system 100 described herein increases the separation efficiency of relatively small particles from engine inlet air without increasing (or at least significantly impacting) core pressure loss.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A gas turbine engine, comprising:
  a compressor section, a combustion section, and turbine section disposed in flow series, the compressor section having an air inlet; and
  an inlet particle separator system coupled to, and disposed upstream of, the compressor section, the inlet particle separator system, comprising:
  a hub section;
  a shroud section surrounding at least a portion of the hub section and spaced apart therefrom to define a passageway, the passageway having an air inlet;
  a splitter disposed downstream of the air inlet and extending into the passageway to divide the passageway into a scavenge flow path and an engine flow path; and
  a plasma flow control actuator coupled to the hub section and disposed between the air inlet and the splitter,
  wherein the engine has an engine centerline, and wherein:
  the hub section is symmetrically disposed about the engine centerline, and includes an inlet portion, an outlet portion, and a transition portion disposed between the inlet and outlet portions:
  the inlet portion is defined by a first surface having a first maximum angle at a first point, the first maximum angle relative to the engine centerline:
  the outlet portion is defined by a second surface having a second maximum angle at a second point the second maximum angle relative to the engine centerline; and
  the transition portion is defined by a third surface having a curvature that defines a hub turning angle, the hub turning angle defined as a symmetric arc that subtends a first line and a second line;
  the first line is a line that extends through the first point at the first maximum angle; and
  the second line is a line that extends through the second point at the second maximum angle,
  the first maximum angle is greater than 30-degrees, and the symmetric arc is greater than 280-degrees.

2. The engine of claim 1, wherein:
  the first maximum angle is greater than 30-degrees; and
  the symmetric arc is greater than 280-degrees.

3. The engine of claim 1, wherein the plasma flow control actuator is disposed on the transition portion.

4. The engine of claim 3, wherein the plasma flow control actuator is disposed closer to the engine flow path than it is to the air inlet.

5. The engine of claim 1, wherein:
  the hub section has an outer diameter that gradually increases downstream of the air inlet to a point of maximum diameter;

the hub section and the shroud section are configured such that the passageway downstream of the point of maximum diameter defines a separation section that includes the scavenge flow section and the engine flow path; and
the splitter extends into the separation section.

6. The engine of claim 1, wherein the plasma flow control actuator comprises:
   a dielectric having a first side and an opposing second side;
   a first electrode coupled to the first side of the dielectric; and
   a second electrode coupled to the second side of the dielectric.

7. The engine of claim 6, further comprising an AC electrical power source, the electrical power source electrically coupled to the first and second electrodes.

8. The engine of claim 1, further comprising one or more additional plasma flow control actuators.

9. An inlet particle separator system for an engine having an engine centerline, comprising:
   a hub section;
   a shroud section surrounding at least a portion of the hub section and spaced apart therefrom to define a passageway, the passageway having an air inlet and a cross sectional flow area;
   a splitter disposed downstream of the air inlet and extending into the passageway to divide the passageway into a scavenge flow path and an engine flow path; and
   a plasma flow control actuator coupled to the hub section and disposed between the air inlet and the splitter,
   wherein:
      the hub section is configured to be symmetrically disposed about the engine centerline, and includes an inlet portion, an outlet portion, and a transition portion disposed between the inlet and outlet portions,
      the inlet portion is defined by a first surface having a first maximum angle at a first point, the first maximum angle relative to the engine centerline,
      the outlet portion is defined by a second surface having a second maximum angle at a second point, the second maximum angle relative to the engine centerline,
      the transition portion is defined by a third surface having a curvature that defines a hub turning angle, the hub turning angle defined as a symmetric arc that subtends a first line and a second line,
      the first line is a line that extends through the first point at the first maximum angle,
      the second line is a line that extends through the second point at the second maximum angle,
      the first maximum angle is greater than 30-degrees,
      the symmetric arc is greater than 280-degrees, and
      the plasma flow control actuator is disposed on the transition portion.

10. The system of claim 9, wherein the plasma flow control actuator is disposed on the transition portion.

11. The system of claim 10, wherein the plasma flow control actuator is disposed closer to the engine flow path than it is to the air inlet.

12. The system of claim 9, wherein:
   the hub section has an outer diameter that gradually increases downstream of the air inlet to a point of maximum diameter;
   the hub section and the shroud section are configured such that the passageway downstream of the point of maximum diameter defines a separation section that includes the scavenge flow section and the engine flow path; and
   the splitter extends into the separation section.

13. The system of claim 9, wherein the plasma flow control actuator comprises:
   a dielectric having a first side and an opposing second side;
   a first electrode coupled to the first side of the dielectric; and
   a second electrode coupled to the second side of the dielectric.

14. The system of claim 13, further comprising an electrical power source, the electrical power source electrically coupled to the first and second electrodes.

15. The system of claim 14, wherein the electrical power source comprises an alternating current (AC) power source.

16. The system of claim 9, further comprising one or more additional plasma flow control actuators.

* * * * *